May 30, 1933. J. M. G. FULLMAN ET AL 1,912,186
METHOD AND MACHINE FOR MAKING INSULATED BUSHINGS
Filed Feb. 17, 1930 10 Sheets-Sheet 1
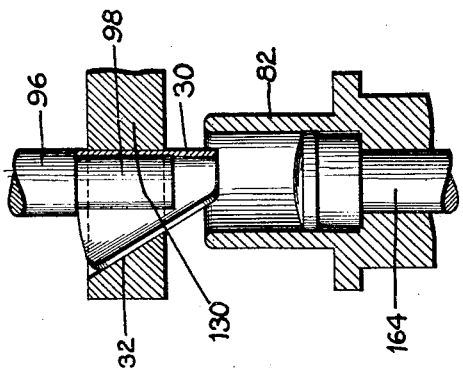
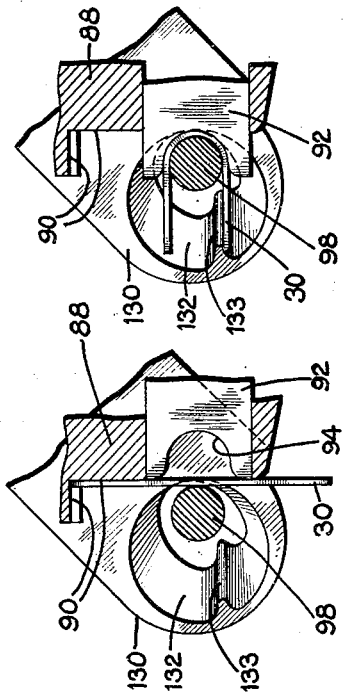
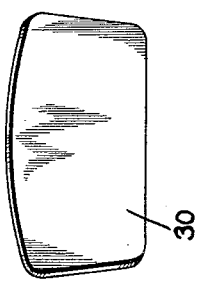
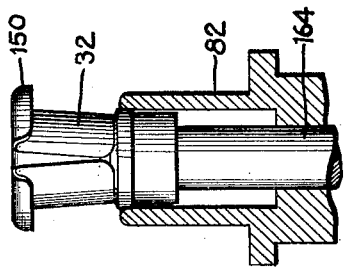
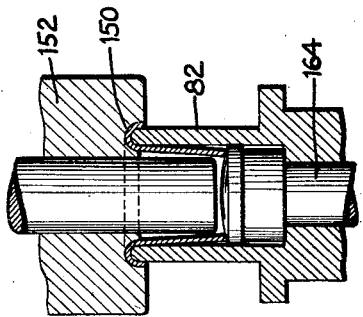
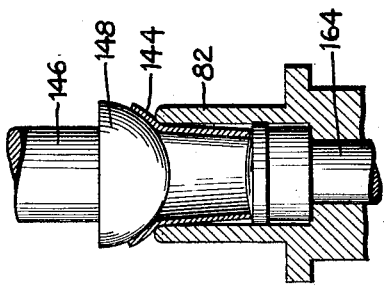
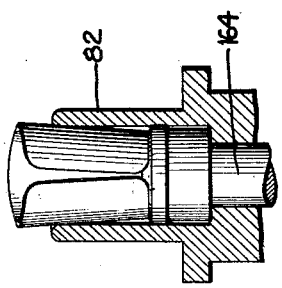
Inventors
James M. G. Fullman
John Strama
By their Attorneys
Cooper, Kerr & Dunham

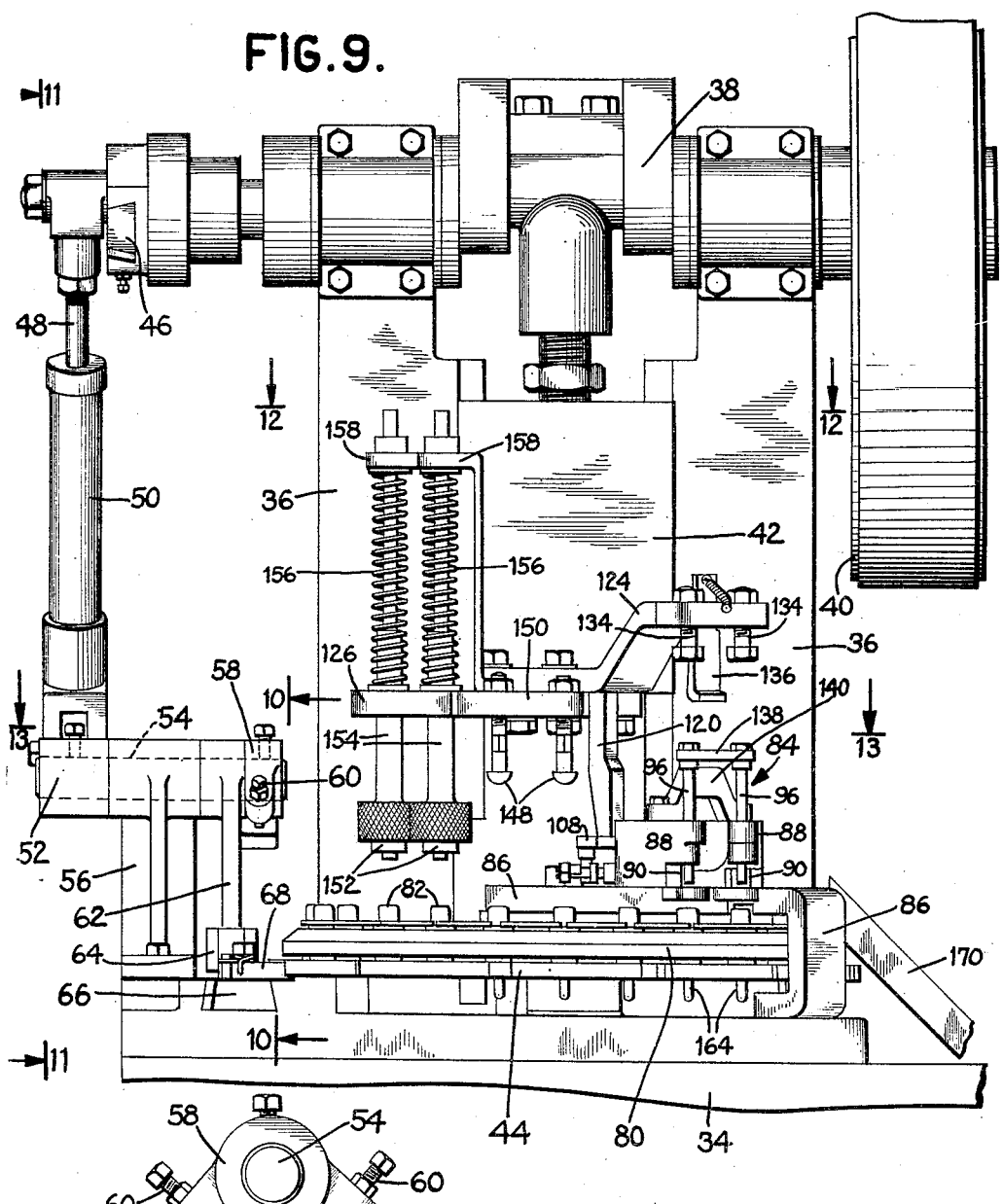
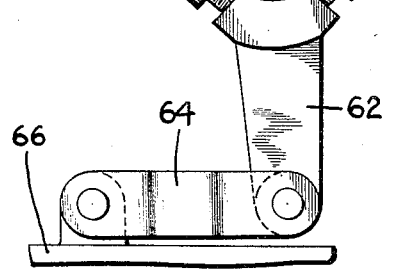

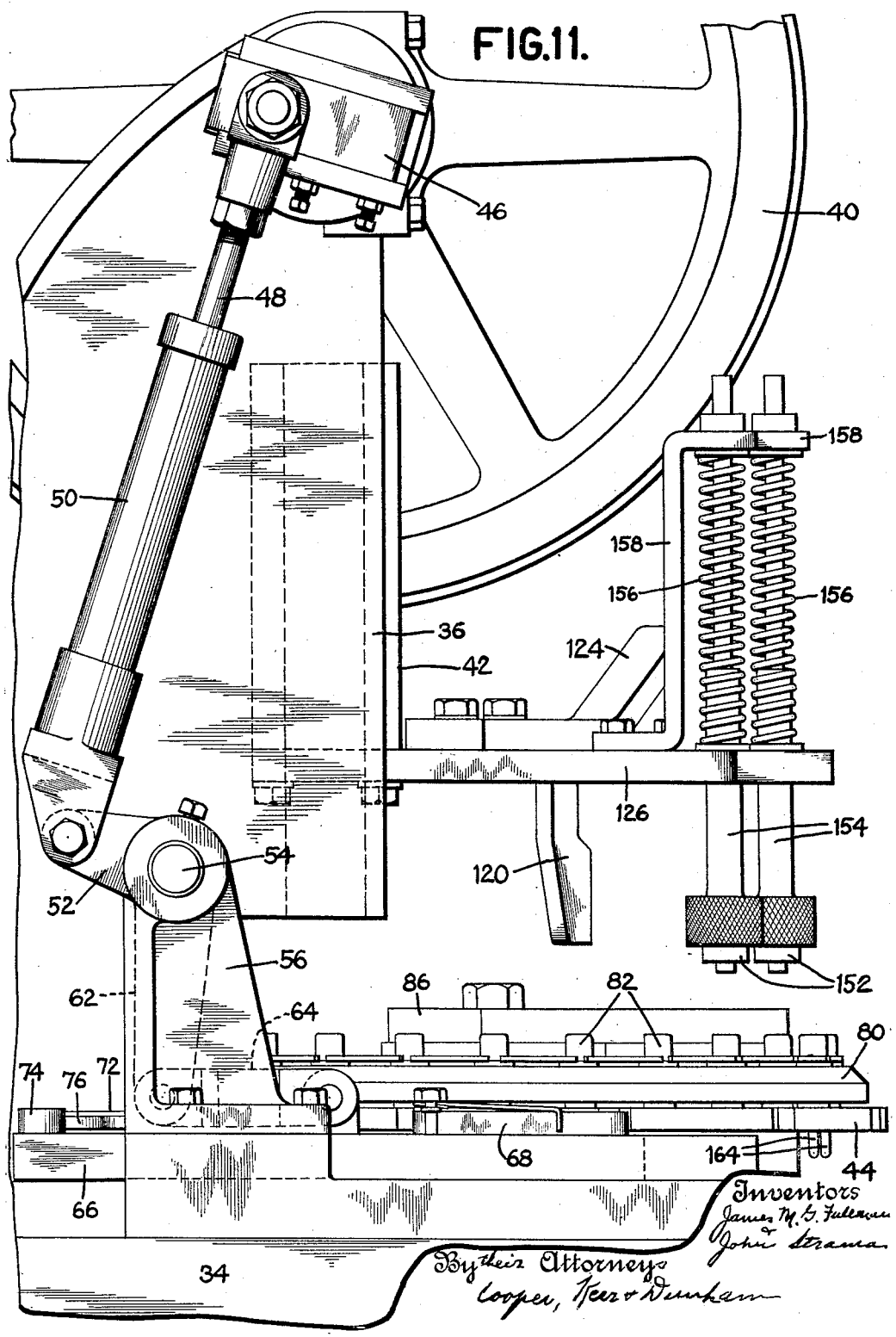

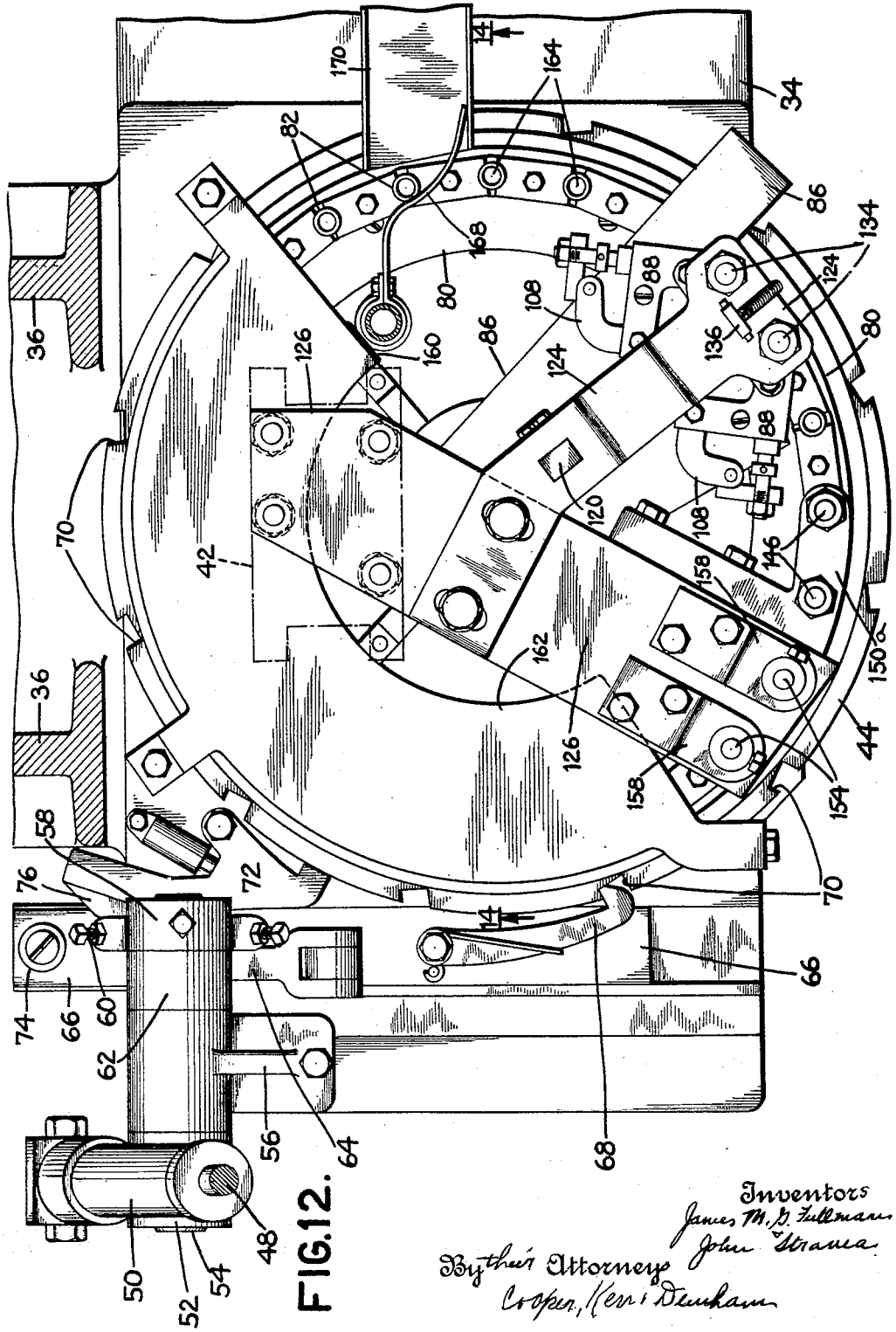

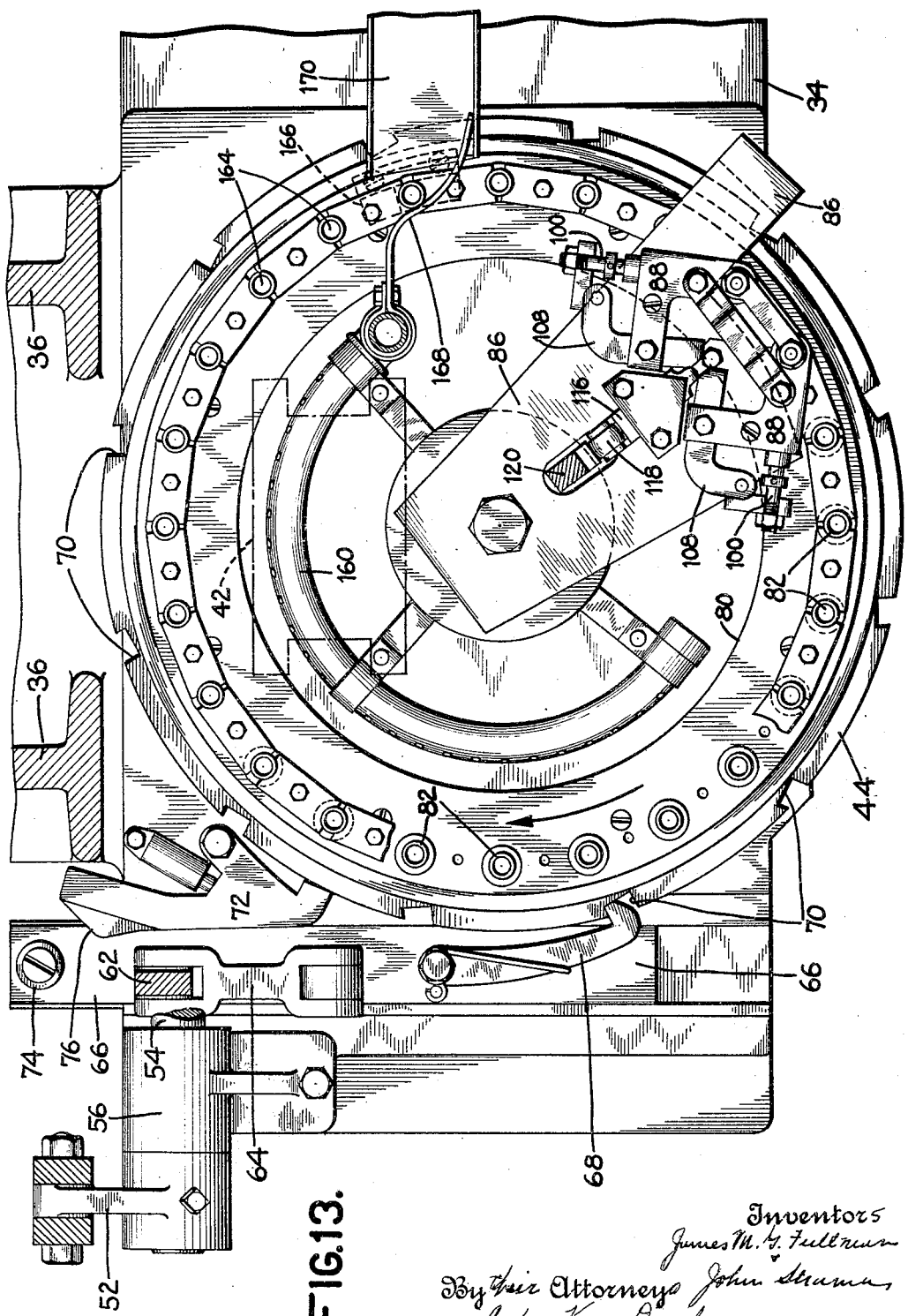

May 30, 1933.  J. M. G. FULLMAN ET AL  1,912,186
METHOD AND MACHINE FOR MAKING INSULATED BUSHINGS
Filed Feb. 17, 1930   10 Sheets-Sheet 6
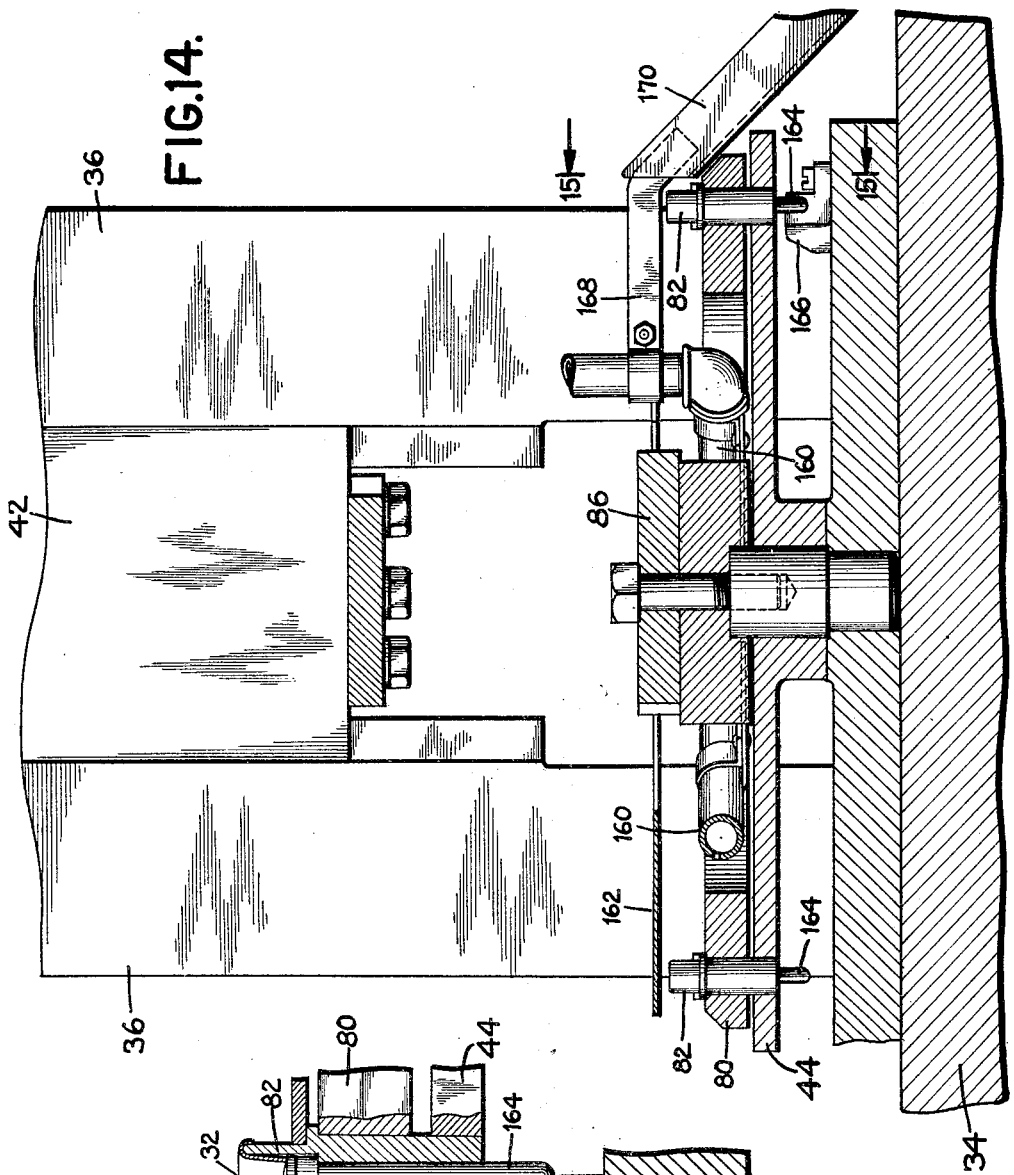
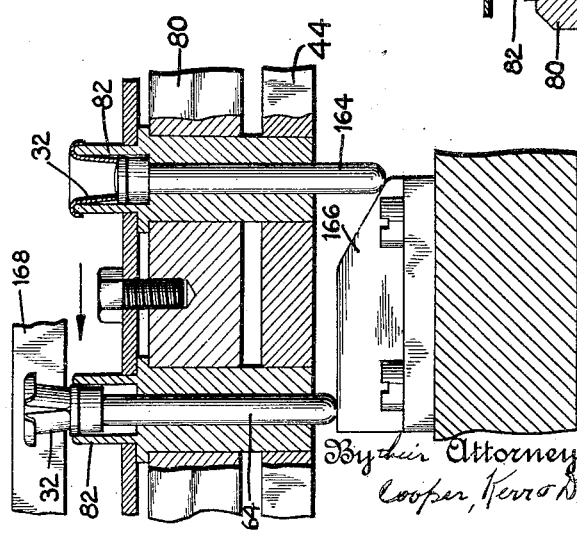
Inventors
James M. G. Fullman
John Strauss
By their Attorneys
Cooper, Kerr & Dunham

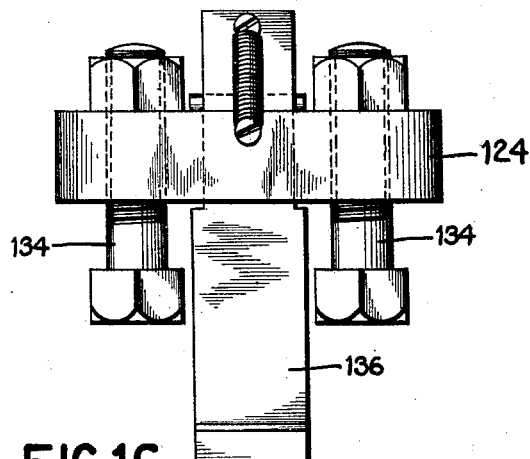
FIG.16.
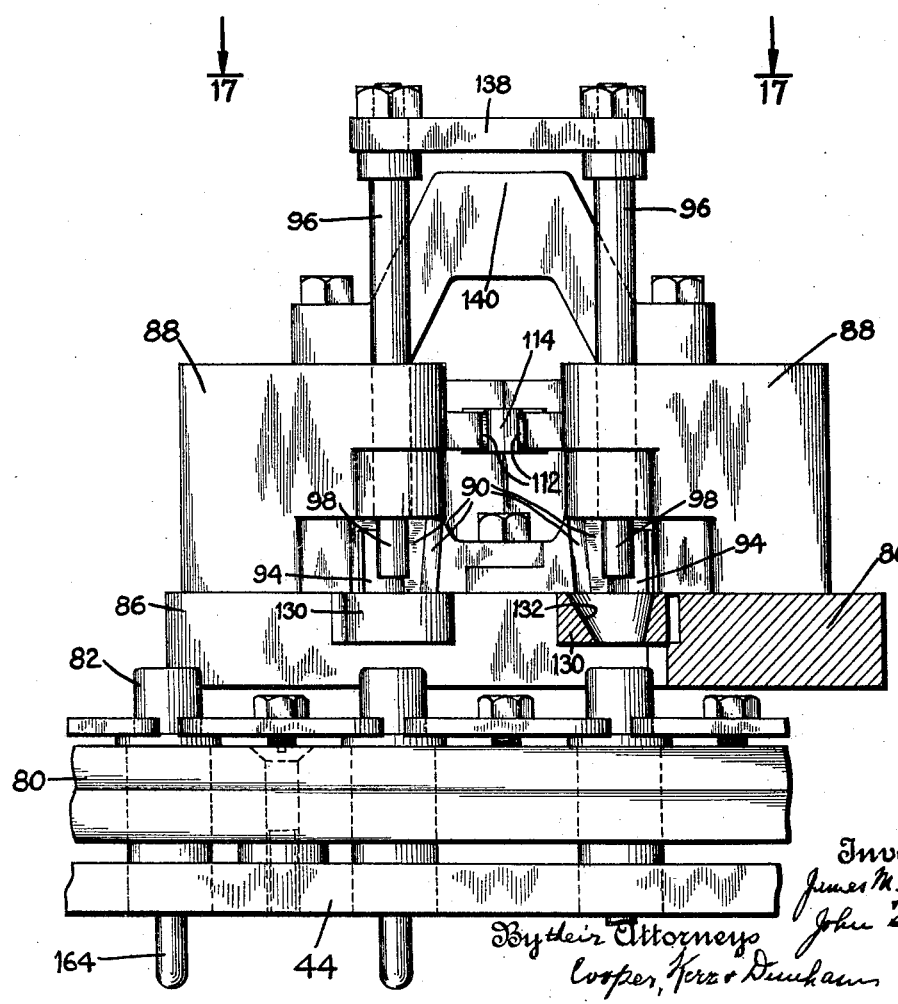

May 30, 1933. J. M. G. FULLMAN ET AL 1,912,186
METHOD AND MACHINE FOR MAKING INSULATED BUSHINGS
Filed Feb. 17, 1930 10 Sheets-Sheet 9
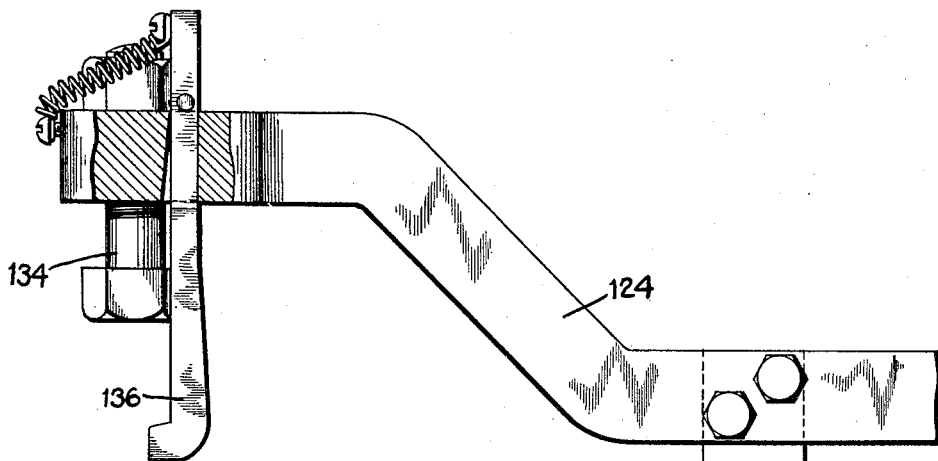
FIG.18.
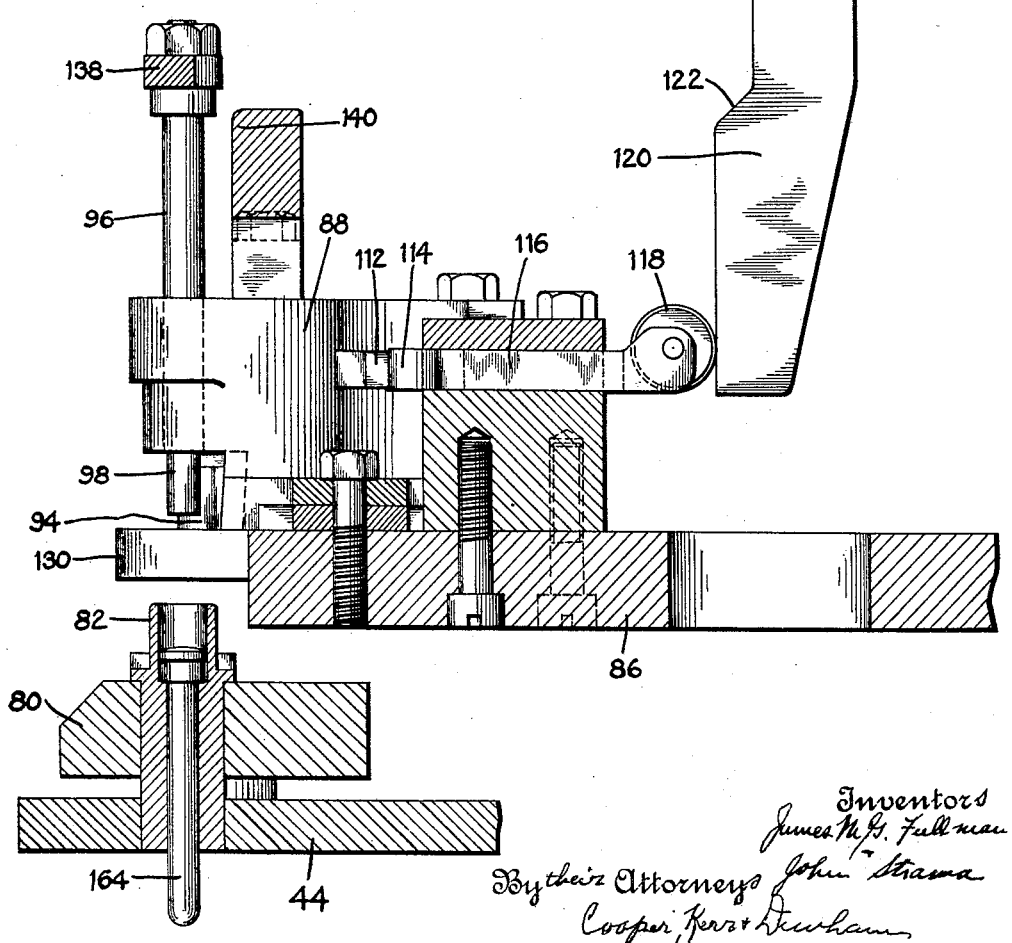

May 30, 1933.  J. M. G. FULLMAN ET AL  1,912,186
METHOD AND MACHINE FOR MAKING INSULATED BUSHINGS
Filed Feb. 17, 1930  10 Sheets-Sheet 10
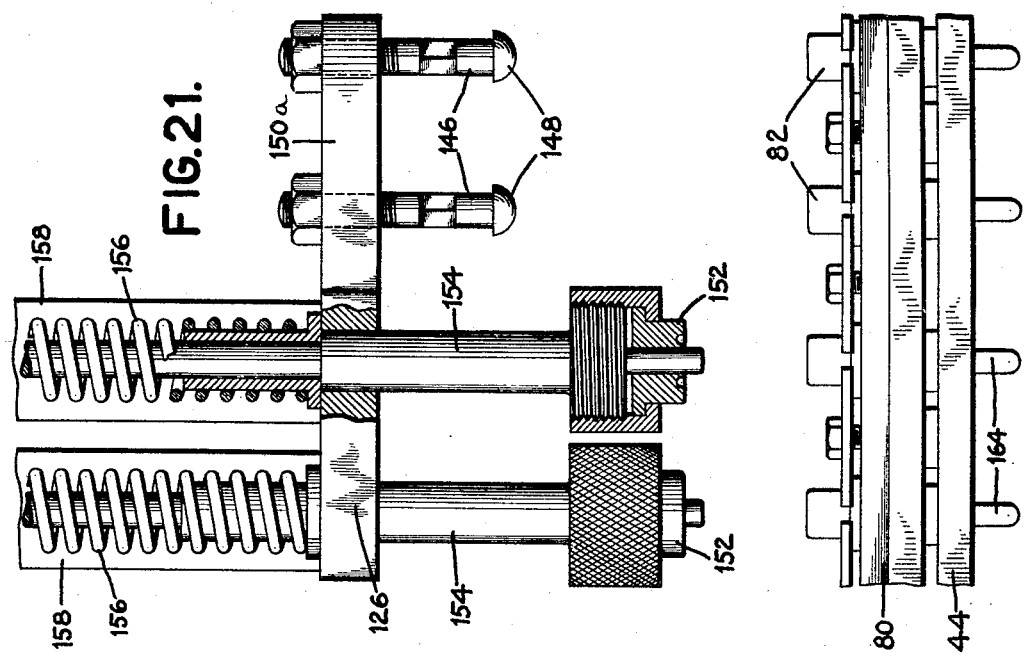
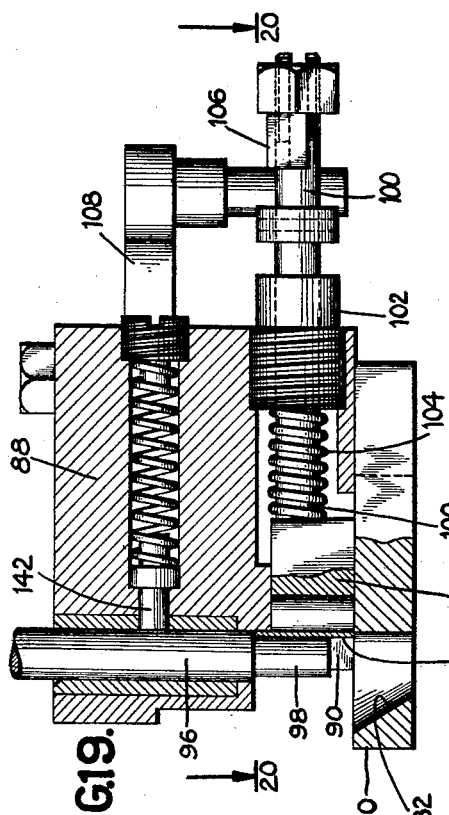

Patented May 30, 1933

1,912,186

UNITED STATES PATENT OFFICE

JAMES M. G. FULLMAN, OF SEWICKLEY, AND JOHN STRAMA, OF AMBRIDGE, PENNSYLVANIA, ASSIGNORS TO NATIONAL ELECTRIC PRODUCTS CORPORATION, OF NEW YORK, N. Y., A CORPORATION OF DELAWARE

METHOD AND MACHINE FOR MAKING INSULATED BUSHINGS

Application filed February 17, 1930. Serial No. 428,881.

This invention relates to a novel method and machine for making insulating bushings from hard fibre stock.

One object of the present invention is to provide for a method of bushing manufacture which will enable bushings to be made with dispatch and at low cost and with the minimum of attention upon the part of the operator.

A further object of the present invention resides in the provision of a novel method and machine for bushing manufacture in which it is only necessary to load the machine with the raw stock in flat form. Thereafter by the operation of the machine there are performed a number of fabricating steps such as preliminarily shaping the blanks, further shaping the blanks, heating the completely shaped blanks and finally ejecting the completed bushings from the machine. Preferably certain operations are performed successively upon the blanks, but concurrently with the performance of other operations upon other blanks in the machine.

Further and other objects of the present invention will be hereinafter set forth in the accompanying specification and claims and shown in the drawings, which by way of illustration show what I now consider to be a preferred embodiment of the invention.

In the drawings:

Figures 1 to 8 inclusive show the various steps of the method of making the bushings;

Fig. 9 is a front elevational view of the machine;

Fig. 10 is a detail sectional view taken on lines 10—10 of Fig. 9;

Fig. 11 is an elevational view of the machine looking from the left, the view being taken generally along lines 11—11 of Fig. 9;

Fig. 12 is a transverse sectional view taken substantially on lines 12—12 of Fig. 9 and looking in the direction of the arrows;

Fig. 13 is another transverse sectional view taken substantially on lines 13—13 of Fig. 9 and looking in the direction of the arrows;

Fig. 14 is a vertical transverse sectional view taken substantially on lines 14—14 of Fig. 12;

Fig. 15 is a detail view showing the means for ejecting the bushings from the die. The section is taken substantially on lines 15—15 of Fig. 14;

Fig. 16 is an enlarged front elevational view of certain parts of the feeding mechanism which are shown in a reduced scale on Fig. 9. In Fig. 9 the parts are shown in an angular view whereas Fig. 16 shows a true elevational view with certain parts shown in section;

Fig. 17 is also an enlarged view of certain parts shown on Fig. 13;

Fig. 18 is a detail sectional view of certain parts shown on Fig. 17, the section being taken substantially on lines 18—18;

Fig. 19 is a detail section taken on lines 19—19 on Fig. 17;

Fig. 20 is another detail section taken on lines 20—20 of Fig. 19; and

Fig. 21 is an enlarged view taken partly in section of certain parts shown also in Fig. 9.

Figure 17:
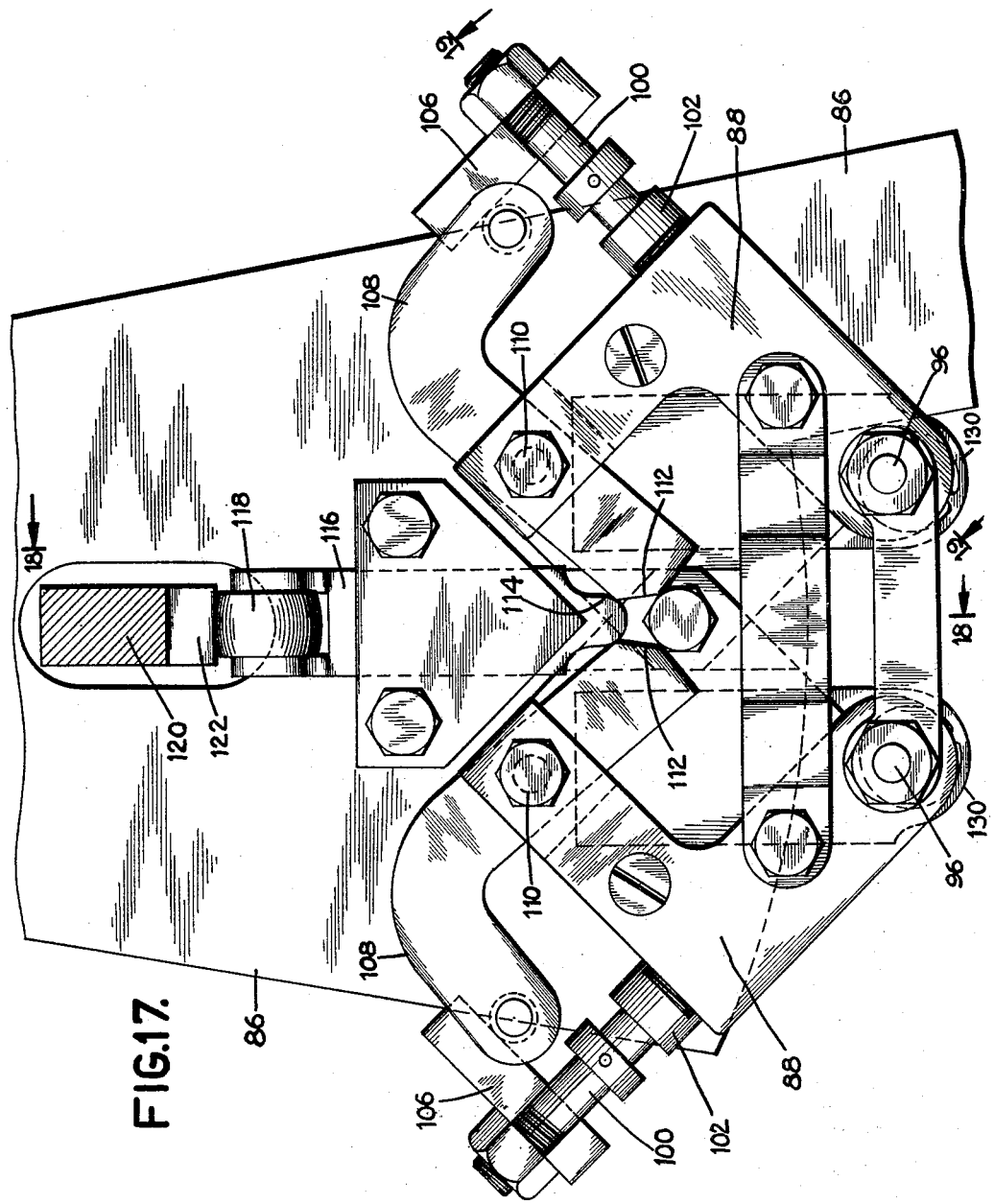
Fig. 17 is a plan view of a certain part shown in Fig. 16, the section being taken substantially on lines 17—17 of that figure.

Before describing details of the machine, the various steps which the machine is intended to perform will be briefly referred to in connection with the diagrams, Figs. 1 to 8 inclusive.

Fig. 1 shows the blank of fibre which is received by the machine and operated upon by the machine. The fibre blank 30 previously to being introduced into the machine is moistened and softened. The first step in the method which the machine performs on the blank is to curl the blank. This step is indicated in Figs. 2 and 3. Fig. 2 shows the blank just prior to its being acted upon and Fig. 3 shows the blank 30 distorted generally into a U-shape.

Fig. 4 indicates diagrammatically the next step in the method in which the blank is shaped with a shank, preferably having a tapering and slightly conical configuration. This operation shown in Fig. 4 also produces configuration which provides the overlap of the edges of the blank when it is inserted in a conduit when in use. Fig. 5 shows the blank provided with the tapering configuration of the shank and received in the forming die in which further steps of the shaping operations are performed.

Fig. 6 shows the next step of the method in which the top of the blank is flared outwardly.

Fig. 7 shows the succeeding step in which the curled lip is provided on the upper end of the blank. This is the concluding shaping and forming step performed in the machine. Subsequently certain heating steps are carried out to expel moisture from the shaped blanks and cause them to have a permanent set and eventually the completed bushing is ejected from the die, the completed bushing being shown in Fig. 8 just after it is ejected from the die. After the bushings are removed from the machine (see Fig. 8) they are coated with wax to prevent absorption of moisture into the fibrous material, otherwise the bushings might distort if stored in damp places. High insulating value is also retained.

Briefly, the foregoing explains certain of the various steps which are employed in converting a fibre blank from the flat form of Fig. 1 to the form of complete bushing as indicated at 32 in Fig. 8.

Referring now to Fig. 9 the machine which is employed for fabricating the bushings generally can be stated to comprise a punch press having a rotatable turret or table disposed under the punch head. In Fig. 9, 34 is the fixed base of the machine provided with upright frame members 36 which rotatably support the crank shaft 38. 40 is the fly wheel and the drive may be imparted to this part in any desired way as by belt or suitable gearing not shown. The part generally designated 42 comprises the reciprocating head or ram of the punch press. It is operated in the usual way from the crank shaft. The rotating table is shown at 44, it being suitably mounted so as to be rotatable upon the base 34.

Intermittent table rotating mechanism

To impart intermittent steps of rotation to the table the following train of mechanism is employed. Disposed upon the end of the crank shaft 38 there is an adjustable eccentric member 46 (see also Fig. 11), which can be adjusted in or out to the desired point to provide for the desired throw of a connecting rod or link 48. While a rigid link could be employed, preferably the inside of the tubular housing 50 is provided with a spring to provide a yielding connection to the bell crank arm 52. 52 in turn is secured to a rock shaft 54 suitably supported in a supporting standard 56 and fixed to shaft 54 is a member 58 carrying set screws 60 which can be adjusted to provide desired clearance with respect to shoulders on a depending arm 62 (see Fig. 10). The arm 62 at its lower end has an arm connected horizontally indicated at 64 which at its opposite end (see Fig. 13) connects to a sliding member 66 which member in turn carries a spring pressed pawl 68. As the pawl 68 is reciprocated back and forth it engages notches 70 in the rotating table and advances the table with a step by step movement. To prevent retrograde movement of the table a retaining pawl 72 is provided which is preferably spring pressed into engagement with the table. Provision is made for positively disengaging the retaining pawl 72 from the notches in the table and this is preferably effected by providing a cam roller 74 upon the reciprocating member 66 and providing a camming tail portion 76 on the retaining pawl 72. Thus the table movement is synchronized with the ram 42.

As shown in Fig. 13, the reciprocating pawl carrier 66 has moved partially in a retrograde movement and is feeding the table in a clockwise direction. The rotatable table has a number of die assembles carried upon a super-structure.

Die mounting

Referring to Figs. 9, 13, 14 and 18, the rotatable table 44 has supported above it an annular die carrying ring 80. Preferably this die carrying ring is of a metal which is well adapted to conduct heat, for example, copper. This is for a purpose which will be hereinafter explained.

Mounted in the ring 80 are a number of dies 82, one being shown in section in Fig. 18. It is in these dies 82 that the final forming steps are carried out as indicated in Figs. 5 to 7 inclusive.

Preliminary blank shaping mechanism

Referring to Fig. 9, the mechanism generally designated 84 comprises the parts for effecting the preliminary forming operations upon the blank. As shown in Figs. 9 and 13 there is provided a member 86 which is fastened to the base of the machine and which extends over the turn table and over the dies. Fixed to this member are two angle-shaped pieces 88 (see Fig. 13). The preliminary blank forming parts are duplicated and accordingly, one only of them will be described. As shown in Fig. 20, each member 88 is provided with a right angle recessed portion 90. Slidable in 88 is a forming element 92, having a curved forming end 94.

The first step in the operation of the machine is to load it. The operator grasps two of the flat blanks 30 and places each blank in the machine in the recesses 90 in each block 88. The members 88 also carry slidable plungers 96 (see Fig. 19).

It will be understood that if 92 (Fig. 20) is advanced to the left that the blank will be curled around 98 to carry out the steps indicated in Figs. 2 and 3. The manner of obtaining a reciprocation of 92 will now be described.

Referring to Fig. 20, part 92 has rigidly secured to it a plunger 100 which passes through a bushing 102 fitted in 88. Intermediate 92 and 102 is an operating spring 104. Part 92 is moved to the left by the action of this spring 104 and the spring is compressed in the following manner. Plunger 100 carries on its end a block 106 adapted to cooperate with a roller carried on an arm 108. The arm 108 is oscillated in the following manner. Referring now to Fig. 17, arm 108 is pivoted on 88 at 110 and beyond the pivot is provided with a camming surface 112. The camming surface 112 is adapted to be engaged by the camming surface 114 of a camming plunger 116 which plunger is suitably mounted in a fixed frame part of the machine. The camming plunger 116 in turn at its rear end carries a roller 118, which roller cooperates with a member 120 (see Fig. 18) having a cam surface 122 disposed thereon. Member 120 is in turn connected to a part 124, which part 124 is secured to a transverse plate 126, Fig. 12. Plate 126 is in turn connected to the ram 42, the ram being shown in dotted lines in Fig. 12. The action is as follows: As the ram descends, part 120 descends along 118 to ride down the cam surface 122. This action is brought about by the spring 104 (Fig. 20) previously referred to. By this action 92 (Fig. 20) is advanced to preliminarily form the blank. Upon the retraction of the ram towards upper position the cam edge 122 forces roller 118 (Fig. 18) to the left in turn advancing the plunger 116 with its camming end 114 (Fig. 17) rocking 108 in a counterclockwise direction and through the block 106 retracting plunger 100 and recompressing the spring 104.

As before mentioned the above mentioned parts are duplicated so that two blanks are curled into loop form concurrently, the operator placing two blanks in the machine preliminary to this forming operation.

It will be noted in Fig. 18 that the camming surface 122 is disposed part way up 120. Accordingly there is continued ram motion after the roller 118 has passed beyond cam 122. This motion is utilized for certain succeeding forming steps on the blank as will now be described.

Referring to Figs. 16, 19 and 4 there is provided just below each plunger 96, 98 and secured to the block 88 a forming die structure 130, which forming die has a conical or tapered surface 132 (Fig. 19) as shown in Figs. 19 and 4, and also with an interior lip portion 133 (Figs. 2 and 3) to cause the edges of the blank to curl when the shank of the blank is shaped into a tapered configuration. If the plunger 96 is caused to descend, the shoulder on the plunger intermediate portions 98 and 96 will catch the edge of the blank and force the blank from its initial position down into the die 130. The means for providing this reciprocating motion of the plungers 96 will now be described.

Referring to Figs. 18 and 16, the member 124 previously referred to, which as previously stated was connected to the ram, is provided with a crosshead portion which carries two set screws 134. Upon the descent of 124 these set screws, towards the end of the stroke of the ram, engage the tops of the plungers 96 and thus force the plungers downward to carry the blanks into the tapering forming dies 130. In order to retract the plungers, a spring pawl 136 is provided pivoted upon 124. The pawl 136 is, upon descent of 124, adapted to be thrust under the cross member 138 by a camming element 140. Accordingly upon the retraction of 124 the pawl 136 will elevate the plungers. When 136 is free of 140, it will snap free of the cross bar and leave the plungers in elevated position. To prevent inadvertent drop of the plungers 96 after the pawl 136 has released each plunger 96 is provided with an impositive friction brake comprising a spring pressed plunger 142 (see Fig. 19).

The previous description has explained how the blanks are fabricated through the step illustrated in Fig. 4.

It may be explained that after the plunger 96 has reached the position shown in Fig. 4, the motion of the plunger 96 continues forcing the blank completely through the die 130 and providing the blank with the configuration which is shown in Fig. 5. The lip portions 133 shape the blank. The continuous motion of the plunger 96 also carries the partially fabricated blank down into die 82 as shown in Fig. 5.

The next step in the operation is to provide the flare 144 shown in Fig. 6. This flare is provided by bringing a plunger 146 which has a round forming bottom 148 upon it down upon the top of the blank after it is in the die 82. There are a pair of these forming elements 146—148, which members are rigidly carried upon a cross member 150$^a$ (Fig. 21), which member 150$^a$ is in turn secured to the ram reciprocated part 126 previously referred to (see Fig. 12).

It will be understood that in between the forming step which is indicated by Figs. 2 through 5 inclusive, and the step indicated by Fig. 6 on the drawings, that there is a table movement. This is effected by the pawl mechanism previously described, which pawl mechanism displaces the table so as to bring two of the dies 82 from a position under the forming and shaping plungers 96—98 to a position under the subsequent forming elements 146—148. Accordingly, upon the succeeding step of operation of the ram when new blanks are being carried through the fabricating steps shown in Figs. 2 to 5 inclusive, the previously formed blanks are being carried through the operation which is indicated in Fig. 6. Upon the next advancing movement of the die table the blanks which are provided with the flared top portions 144 (Fig. 6) are carried under forming dies to provide the finished lip 150 shown in Fig. 7. The die members for forming such lips 150 comprise the curved top of the dies 82 and cupped recesses in die members 152. (See Figs. 7 and 21.) Dies 152 are carried on plungers 154, which plungers are slidably mounted in part 126 and yieldingly forced down by springs 156. The springs at their upper ends re-act against a bracket 158 (Fig. 11). As 126 descends the die forming operation shown in Fig. 7 is effected and the springs provide for exerting a yielding pressure against the blanks and for maintaining such pressure for a considerable time during the stroke of the ram.

After the blanks have been thus completely fabricated, it is necessary to set them in the form which they have been shaped and pressed and this is accomplished by heating the dies 82 to expel the moisture from the shaped blanks. In order to heat the dies 82 the following mechanism is provided.

Disposed within the die carrying ring 80 which as before stated, is made of copper so as to have high heat conductivity, there is a gas burner 160. This burner has a number of burner openings which impinge the gas flame against the inner edge of the copper plate and in this way the heat is conducted to the dies. In order to confine the heat as much as possible a cover 162 is provided (see Figs. 12 and 14). This also retains the formed blanks in the dies to insure the drying of same and to prevent them from popping out when partly dry.

In the heating step the blanks are carried around through a considerable extent of table movement, in fact, substantially 180°. After they have become thoroughly set and the moisture dried out from the fibre, they are ejected from the dies by an ejecting mechanism which will now be described.

As shown in Figs. 4 to 8 inclusive, each die 82 has within it an ejecting plunger 164. As the table motion proceeds the lower ends of these ejecting plungers 164 contact with a cam 166, Fig. 15, and elevate the plunger to such a position that the plunger ejects the completely formed bushing from the die 82. As each bushing is ejected it is temporarily carried in a plane above the die as shown in Figs. 8 and 15, then as the table motion proceeds the bushing contacts with a guiding finger 168 (Figs. 14 and 13) and such guiding finger diverts the completely fabricated and set bushing into a chute 170 which leads to a hopper without the machine. The fabricating operation is now complete.

Summarizing the operation and method of manufacture of bushings from blanks is as follows: The blanks are first cut out from sheet fibre stock to the configuration shown in Fig. 1. The blanks are then moistened. The operator of the machine then loads it. A pair of blanks are introduced at the same time into duplicate shaping and die loading devices. These devices first impart a U-shaped curl to both blanks, then their further operation brings the ends of the U's together and shape the blanks into tubular form so that upon further operation they can be loaded into the dies. After the dies are loaded a table motion ensues which carries the loaded dies to a subsequent shaping station where both blanks are flared at the top. This flaring operation occurs while other empty dies are being loaded. Further table motion carries the blanks to the lip shaping station, and through the heating section or position and finally to the ejecting station, after which the empty dies are brought back to be reloaded. The timing of the operations is such that certain operations are performed upon certain blanks while other preliminary operations are being performed upon other blanks.

What we claim is:

1. A machine for fabricating bushings from blanks of hard fibre, which comprises, a series of travelling dies, each adapted to carry a blank therein, a pressure exerting shaping mechanism for shaping the blanks while feeding them to the dies, other shaping mechanism for further shaping the blanks while within the dies and heating means for expelling moisture from the blanks while in the dies.

2. A machine for making insulated bushings from hard fibre stock, comprising in combination, means for curving a blank, tubular die means for shaping the blank after it is curved to provide a tapered shank with adjacent marginal edges, said curving and shaping means including a cooperating member for displacing the blank through both said means, means for shaping the blank to provide a curved lip upon one end thereof circumferentially of the shank, and operating means for the aforesaid means to provide correlated action thereof.

3. A machine for making insulating bushings comprising in combination, means cooperating with a flat blank to partially curve it, associated means for thereafter bringing together the marginal edges of the blank and forming a tubular shank portion, said curving and forming means including cooperating means for displacing the blank through both curving and forming operations, means for providing upon and circumferentially about one end of the previously shaped tubular shank turned over lip portions, and means for moving the blanks by the operation of the machine from said first mentioned curving and forming means to the second mentioned means.

4. A machine for making insulating bushings, comprising a rotatable die carrying table provided with a plurality of individual hollow dies, means for imparting intermittent movement thereto to advance the dies by the movement of the table, means for feeding fibre blanks to the respective dies and for preliminarily shaping the blanks while feeding them thereto, a series of operating stations adjacent the dies upon the table, each operating station including means for performing certain shaping steps upon fibre blanks held within the dies, and means for coordinating the operations of the shaping means at the stations to and with the advancing motion of the table so that the shaping means operate to perform certain shaping operations between the intermittent movements of the table which carry the previously shaped blanks from one station to other shaping means for other operations.

5. A bushing making machine including means for preliminarily curving a flat fibre blank into curved form, and die means cooperating with the aforesaid means and operating in harmony therewith for engaging an end edge of the curved blank and thereby forcing the same through an open shaping die to a receiving member, to bring the edges of the blank together and to form a tubular shank portion.

6. In a machine for making insulating bushings from hard fiber stock, the combination of means for shaping flat blanks into an open curved configuration, an open forming die, a series of traveling dies, pressure means associated with said shaping mechanism for shaping operation of the same and for urging successive blanks shaped by the latter through the forming die and into the successive traveling dies, whereby a tubular configuration is imparted to the blanks, and means for further shaping the blanks while disposed in the traveling dies, said traveling dies being movable at a right angle to and out of the path of the blanks through the open die, for presenting the blanks to the further shaping means.

7. The combination described in claim 5 in which the interior of the shaping die is provided with a lengthwise disposed lip portion adapted to engage both ends of a blank when it is forced through the said die, for facilitating the imparting of a tubular configuration to the blank.

8. In a machine for making insulating bushings from hard fiber stock, the combination of a movable plunger member, means for curving a blank about one side of said member, and an open forming die through which said member is adapted to move for further curving the said blank, said plunger member being constructed to engage an edge of said blank for removing the latter from the curving means and urging it through the forming die, whereby the blank is further curved about the member.

9. The combination described in claim 8 in which there is also provided a receiving die adjacent said forming die and in which the plunger member is adapted to further carry the blank into said receiving die, the latter being adapted to cooperate with the forming die for imparting a tubular configuration to the blank.

10. A machine for making insulating bushings from hard fiber stock comprising a set of hollow dies, means for imparting an intermittent progressional movement thereto, a loading station, means for loading the blanks into the interior of the dies, and for concurrently performing pressure curving operations upon the blanks while they are being loaded into the dies so that the blanks are given proper configuration to be introduced into the dies.

11. The method of making insulating bushings from precut fiber blanks, which comprises first moistening the blanks, then forming the blanks into U-shaped configuration, then introducing the blanks into dies and providing a tubular configuration therefor while they are being so introduced, then effecting a series of forming operations upon one end of the blanks when in the dies, each such operation being effected by pressure exerted simultaneously at all points to be formed, and maintaining one forming operation until the blanks have attained a permanent set under the effect of heat which expels the moisture from the blanks.

12. A bushing making machine including a die adapted to receive a blank which is shaped in tubular form, and means for forming a lip portion upon and circumferentially about one end of said blank, said means comprising means including a pressing die for first flaring the upper end of the blank, and means for completing the shaping of the curved lip upon the blank, both said flaring and shaping means coacting with the aforesaid receiving die in flaring and shaping operations upon the blank while the latter remains in the receiving die.

13. In a machine for making insulating bushings from hard fibre stock, pressure means for bending a flat blank into U-shape, and associated means for further shaping the blank into tubular form, both said means including in common a blank-displacing member adapted to cooperate in pressure bending operation of the first-mentioned means and constructed for engaging an end edge of the blank and for thereby removing the blank from the first mentioned means and forcing it through the associated tubular shaping means for shaping operation thereof.

14. A machine for making insulating bushings from hard fibrous stock which comprises means for introducing flat blanks into the interior of a series of dies, means for imparting a step by step progressive motion to the dies, cooperating means for performing with a common application of pressure a plurality of pressure shaping operations on a corresponding plurality of blanks in the dies, and resilient means for causing more prolonged pressure on the blanks in one than in other of said operations while the blanks are in the dies and during the intermission between movements of the dies.

In testimony whereof we hereto affix our signatures.

JAMES M. G. FULLMAN.
JOHN STRAMA.